United States Patent
Farhan et al.

(10) Patent No.: US 10,185,508 B1
(45) Date of Patent: Jan. 22, 2019

(54) REMOTE STORAGE DEVICE DESTRUCTION

(71) Applicant: Amazon Technologies, Inc., Seattle, WA (US)

(72) Inventors: Munif M. Farhan, Clyde Hill, WA (US); Luis Padilla Munoz, Sammamish, WA (US); Troy Cognata, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 15/422,832

(22) Filed: Feb. 2, 2017

(51) Int. Cl.
*G06F 11/00* (2006.01)
*G06F 3/06* (2006.01)
*G06F 21/60* (2013.01)
*G06F 12/14* (2006.01)
*G06F 11/07* (2006.01)
*G06F 8/65* (2018.01)

(52) U.S. Cl.
CPC .......... *G06F 3/0623* (2013.01); *G06F 3/0634* (2013.01); *G06F 3/0652* (2013.01); *G06F 3/0659* (2013.01); *G06F 3/0673* (2013.01); *G06F 11/0727* (2013.01); *G06F 11/0751* (2013.01); *G06F 11/0772* (2013.01); *G06F 11/0793* (2013.01); *G06F 12/1408* (2013.01); *G06F 21/60* (2013.01); *G06F 8/65* (2013.01); *G06F 2212/1052* (2013.01); *G06F 2212/402* (2013.01)

(58) Field of Classification Search
CPC ............. G06F 11/0793; G06F 11/0727; G06F 11/0751; G06F 11/0772
See application file for complete search history.

(56) References Cited

U.S. PATENT DOCUMENTS 6,829,672 B1* 12/2004 Deng .................... G06F 3/0605
365/185.08
2009/0049236 A1* 2/2009 Kinoshita ............. G06F 3/0605
711/112

(Continued)

OTHER PUBLICATIONS

Kissel et al., "Guidelines for Media Santization," *National Institute of Standards and Technology, U.S. Department of Commerce*, downloaded from http://nvlpubs.nist.gov/nistpubs/SpecialPublications/NIST.SP.800-88r1.pdf, 64pp. (document published Dec. 2014).

*Primary Examiner* — Charles Ehne
(74) *Attorney, Agent, or Firm* — Klarquist Sparkman, LLP

(57) ABSTRACT

Technologies are provided for remotely destroying a storage device. One or more commands can be transmitted to a storage device to render the storage device inoperable. The storage device can be placed in a retired operation mode, in which the storage device cannot process data access commands. Data stored in the storage device can be sanitized to prevent it from being retrieved. Code modules that are responsible for processing data access commands can be erased from a firmware of the storage device. The storage device can perform operations to render a storage medium of the storage device inoperable. While in the retired mode, the storage device can process an inquiry command to retrieve information about the storage device from the firmware of the storage device. The retrieved information can be used to generate a digital destruction certificate that can be provided to a supplier of the storage device.

20 Claims, 8 Drawing Sheets

(56) References Cited

U.S. PATENT DOCUMENTS

| | | | | |
|---|---|---|---|---|
| 2012/0260349 A1* | 10/2012 | Nagai | .................... | G06F 21/44 |
| | | | | 726/28 |
| 2014/0149783 A1* | 5/2014 | Georgiev | ............ | G06F 11/0793 |
| | | | | 714/4.2 |
| 2014/0181532 A1* | 6/2014 | Camp | ................. | G06F 11/1068 |
| | | | | 713/190 |
| 2015/0254674 A1* | 9/2015 | Hall | .................... | G06Q 30/012 |
| | | | | 705/302 |
| 2017/0308312 A1* | 10/2017 | Litke | .................... | G06F 11/073 |

* cited by examiner

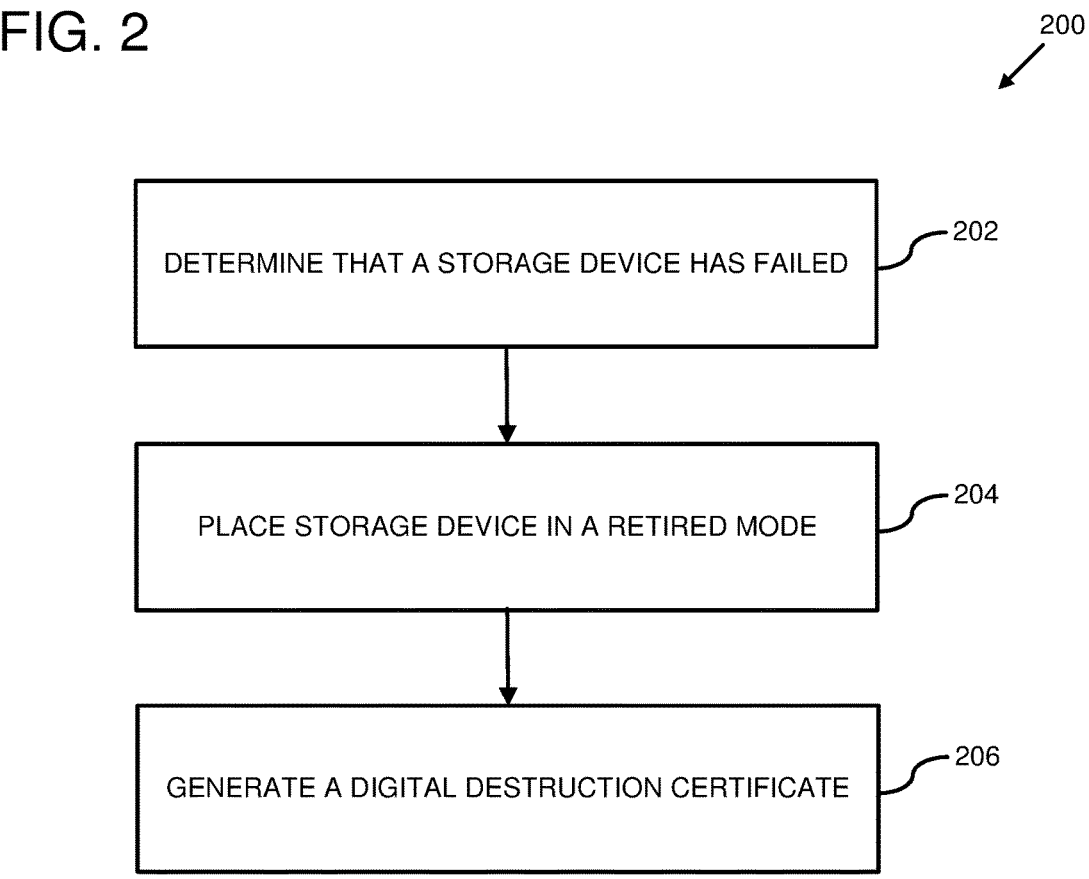

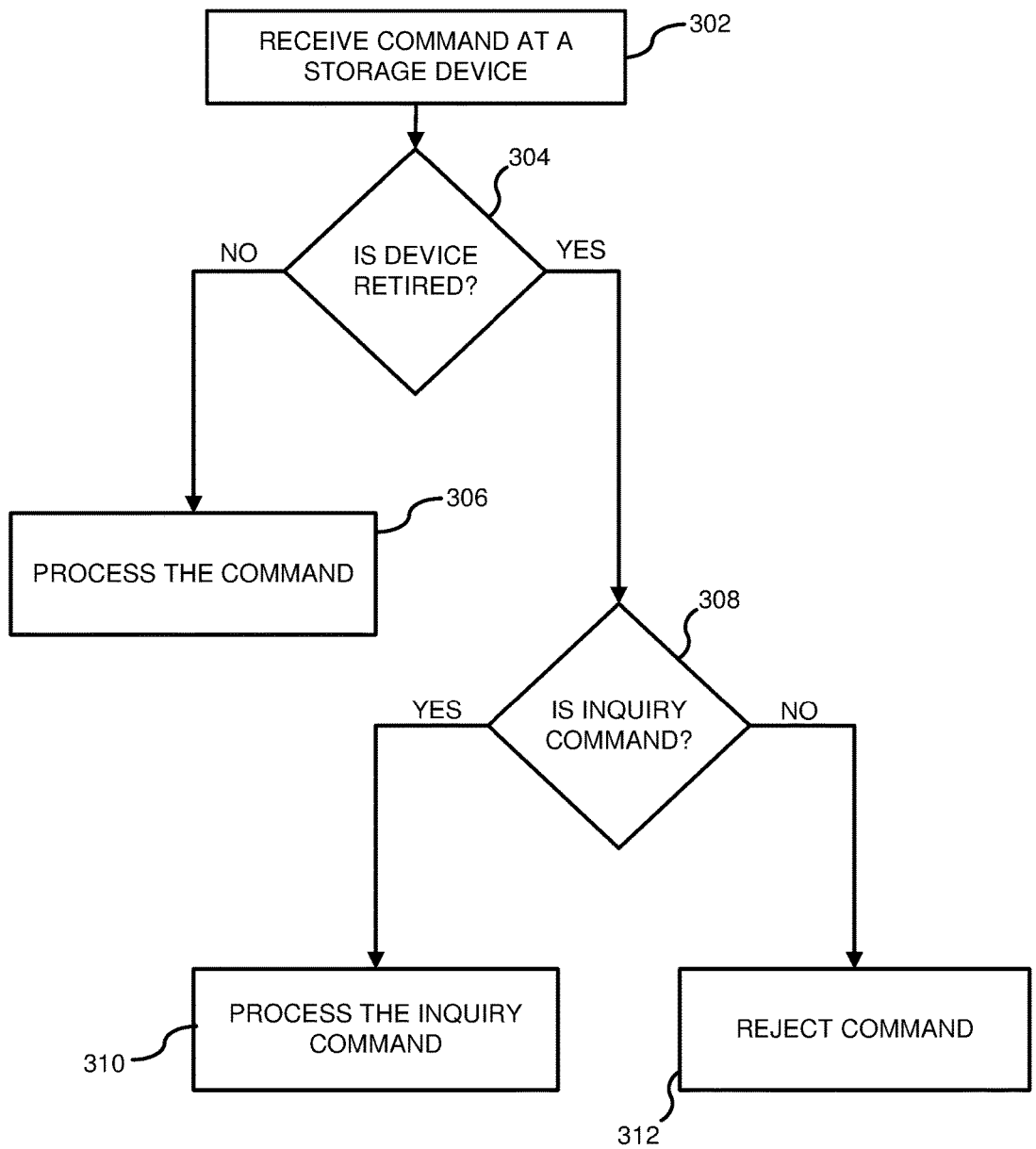

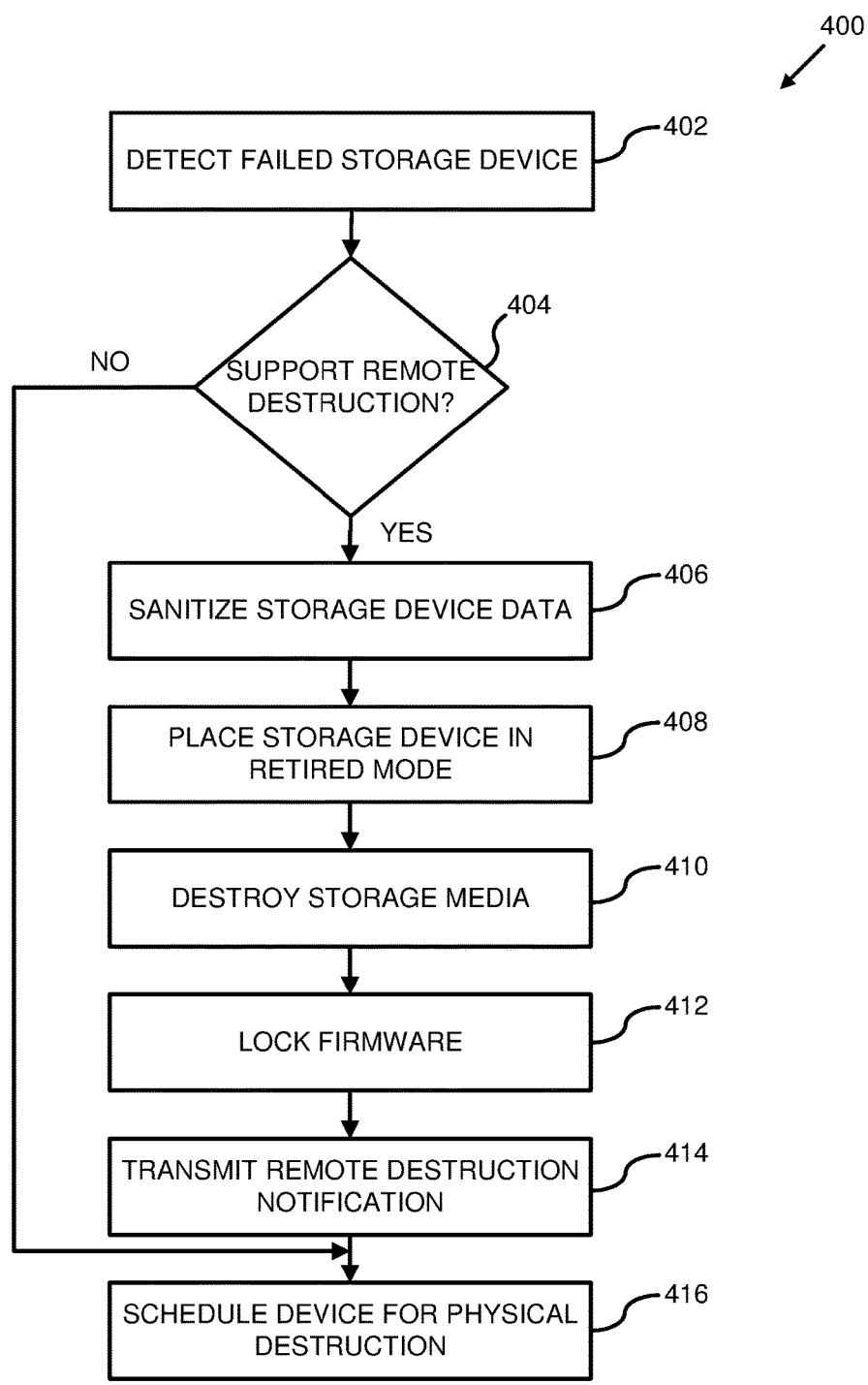

REMOTE STORAGE DEVICE DESTRUCTION

BACKGROUND

Storage device failure is a common occurrence, especially in data centers. For security purposes, some storage devices cannot be removed from data centers in which they reside. When such a storage device fails, it must be physically destroyed. For example, the physical destruction of a storage device can require personnel to physically locate the storage device in a data center, manually disconnect the storage device from a computer, and then physically destroy the storage device. In at least some cases, a computer connected to the failed storage device must be taken offline before the failed storage device can be removed.

BRIEF DESCRIPTION OF THE DRAWINGS

FIG. 2 is a flowchart of an example method for digitally reclaiming a failed storage device.

FIG. 3 is a flowchart of an example method for processing storage device commands in a storage device that supports a retired mode.

FIG. 4 is flowchart of an example method for remotely destroying a storage device.

DETAILED DESCRIPTION

Figure 1A:
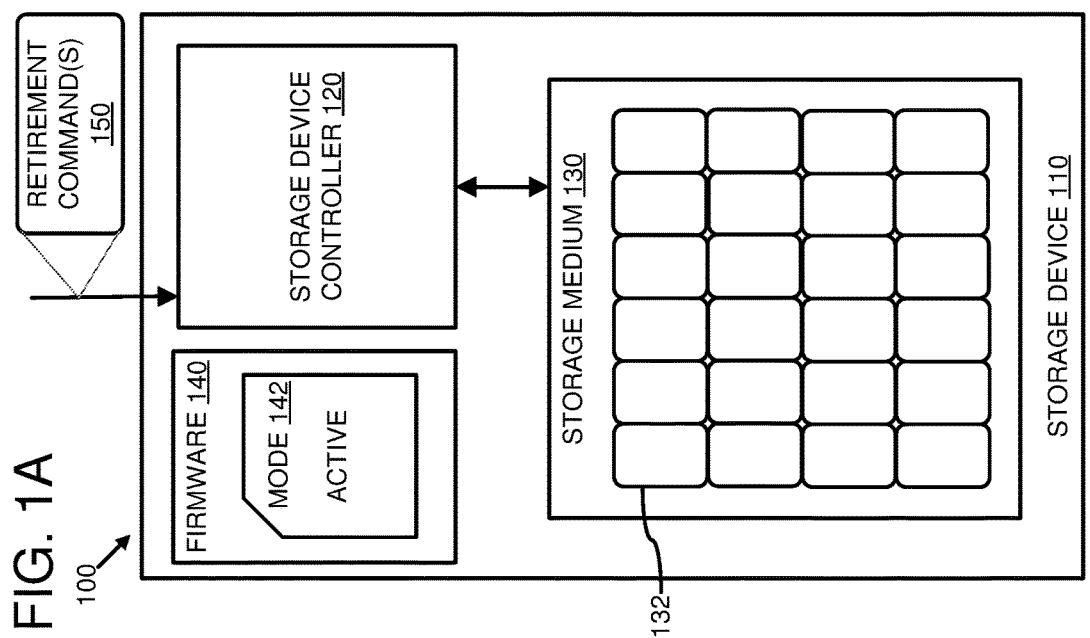
FIGS. 1A-B are system diagrams depicting an example system configured to put a storage device in a retired mode.

Many storage device manufacturers and suppliers provide warranties for their hard drives. If a hard drive fails, such a manufacturer or supplier often will provide a refund or credit in exchange for the failed hard drive. However, for security purposes, some hard drives cannot be physically returned to a manufacturer or supplier. For example, some hard drives cannot be removed from data centers in which they reside. When such a hard drive fails, the manufacturer or supplier may provide a return merchandise authorization (RMA) in exchange for a certification that the hard drive in question has been physically destroyed. Typically, such RMAs provide a refund or credit based on a value of the failed hard drive as of the date of its physical destruction.

In situations where a failed storage device cannot be returned to a supplier, a warranty for the storage device may be redeemed by providing a physical destruction certificate to the supplier of the storage device. However, in some scenarios, arranging for the physical destruction of a storage device can be a non-trivial task. For example, the physical destruction of a storage device can require the storage device to be physically located in a data center, manually disconnected from a host computer, and then physically destroyed. After which, a physical destruction certificate may be manually generated. In at least some cases, a host computer connected to the failed storage device must be taken offline before the failed storage device can be removed.

Given these manpower costs and potential impacts to host computer uptime, physical destruction of failed storage devices is sometimes be deferred until a specified number or percentage of storage devices connected to a given host computer have failed. However, since many storage device suppliers provide refunds or credits based on a value of a storage device as of the date of destruction (and not the date of failure), delay in the physical destruction of a failed storage device can result in a loss of warranty value. This can occur because, in some cases, the storage device has a higher replacement value on the date of failure than it has later on the date it is physically destroyed.

At least some of the embodiments of the technologies described herein solve these problems by enabling storage devices to be remotely destroyed and redeemed using digital destruction certificates.

For example, a storage device can be configured to support a "retired" mode of reduced operation in which the storage device will reject subsequent data access operations. Upon detection of a failure condition in the storage device, one or more commands can be transmitted to the storage device to place the storage device in the retired mode. After being placed in the retired mode, the storage device can no longer be used to store or retrieve data. A digital destruction certificate, certifying the remote "destruction" of the storage device, can be generated and provided to the supplier in order to claim a warranty on the storage device. In at least some embodiments, to perform the destruction of the device, data stored on the storage device can be cryptographically scrambled or erased to prevent any data from being retrieved from the storage device after it is retired. In a different or further embodiment, command modules responsible for performing data access operations can be removed from the storage device. Additionally or alternatively, a storage medium of the storage device can be rendered inoperable. By way of example, a magnetic disk of a hard drive can be rendered inoperable by crashing a read or write head of the hard drive into a surface of the magnetic disk.

Although the examples described herein refer to storage devices, the technologies described herein can be applied to other types of devices as well. For example, a computing device that contains an embedded storage device (such as a switch or router) can be remotely destroyed by using at least some of the techniques described herein to render the embedded storage device inoperable.

FIG. 1A is a system diagram depicting an example system 100 configured to place a storage device 110 in a retired mode. Once in the retired mode, the storage device 110 will be unable to perform data access commands.

The storage device 110 comprises a storage device controller 120, a storage medium 130, and a firmware 140. The storage medium 130 comprises multiple storage locations (e.g., 132) capable of storing data items, such as data blocks, etc. The number of storage locations depicted is provided for illustration purposes and is not intended to be limiting.

The firmware 140 can contain one or more command modules (not shown) that can be used by the controller 120 to cause the storage device 110 to perform various operations. Example command modules include modules for performing data access operations, modules for performing inquiry operations, modules for updating the firmware 140, etc. Although depicted separately, in at least some embodiments, the firmware 140 and the controller 120 can be integrated.

The firmware 140 comprises a mode field 142 that indicates a current operational mode of the storage device 110. The value of the mode field 142 can comprise one or more numbers and/or characters. For example, the mode field 142 can be an enumeration field, such as a bitmask. In FIG. 1A, the mode field 142 is depicted as containing a value indicating that the storage device 110 is in an active mode. In the active mode, the storage device 110 is able to receive and process data access commands.

The controller 120 can be configured to process one or more of the storage device commands. For example, the controller 120 can process data access commands using one or more modules in firmware 120 to access data stored in storage medium 130. Additionally or alternatively, the controller 120 can be configured to process inquiry commands by retrieving and/or calculating information about the storage device 110. Such information can include a current operational mode of the storage device 110, an identifier of a manufacturer of the storage device 110, a serial number of the storage device 110, etc.

The storage device controller 120 can be configured to receive one or more retirement commands 150. The controller 120 can process the one or more retirement commands 150 by placing the storage device 110 in a retirement mode.

Placing the storage device 110 in the retired mode can comprise changing the value of the mode field 142 to indicate that the storage device is retired. The controller 110 can be configured to check the value of the mode field 142 when a data access command is received. If the value of the mode field 142 indicates that the storage device 110 is retired, the controller 120 can reject the data access command. Additionally or alternatively, once the storage device has been retired, the controller 120 can be configured to reject any subsequent attempts to change the value of the mode field 142.

In at least one embodiment, placing the storage device 110 in the retired mode comprises erasing one or more command modules from the firmware 140. For example, command modules can be erased that are responsible for processing data access commands, and/or processing firmware updates. Removing modules responsible for firmware updates can, in at least some cases, prevent the storage device 110 from being taken out of the retired mode by rolling-back the firmware 140. In a different or further embodiment, placing the storage device 110 in the retired mode comprises sanitizing data stored in the storage medium 130. Sanitizing the data in the storage medium 130 can comprise performing one or more operations to cryptographically scramble the data. In a different or further embodiment, placing the storage device 110 in the retired mode can comprise performing one or more operations to render the storage medium 130 inoperable. Rendering the storage medium 130 inoperable can comprise placing the storage medium in a state where it is physically incapable of storing and/or retrieving data from the storage locations (e.g., 132).

Figure 1B:
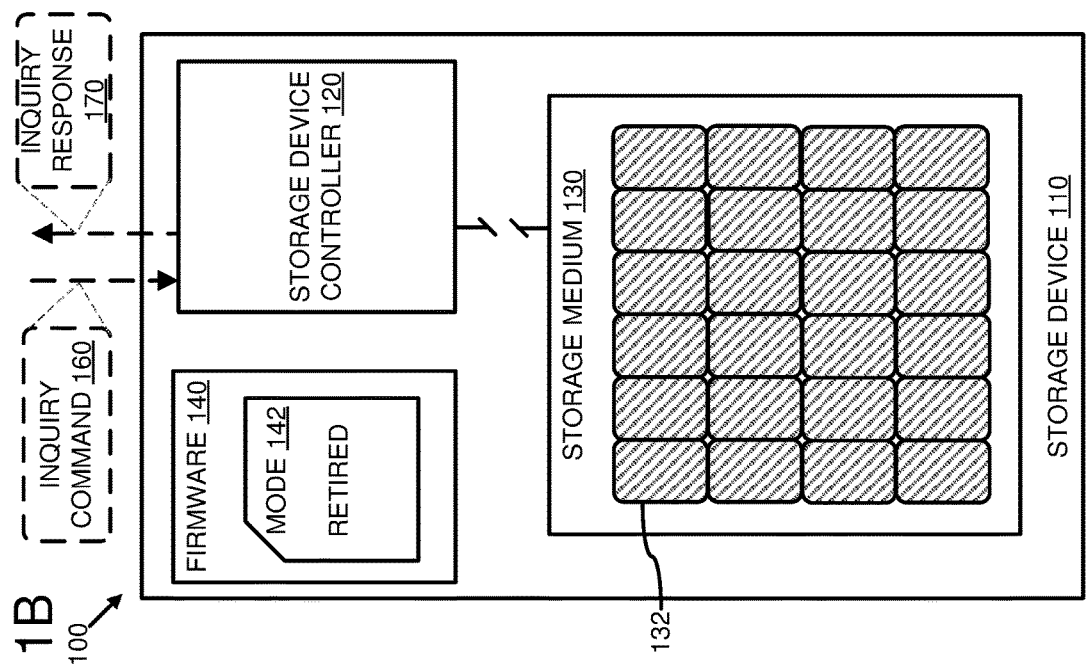

FIG. 1B is a system diagram depicting the example system 100 wherein the storage device 110 is retired. The mode field 142 of the firmware 140 contains a value indicating that the storage device 110 is retired. Data previously stored in the storage medium 130 has been rendered inaccessible (for example, by sanitizing the data and/or rendering the storage medium inoperable). The ability of the storage device controller 120 to interact with the storage medium 130 has been disabled (for example, by changing the value of the mode field 142 to indicate that data access commands are no longer allowed, by erasing one or more data access command modules from the firmware 140, and/or by rendering the storage medium 130 inoperable).

Optionally, the storage device controller 110 can be configured to receive and process an inquiry command 160 when the storage device 110 is in the retired mode. The inquiry response 170 can comprise a status indicating the storage device is in the retired mode, a date and/or time the storage device was placed in the retired mode, a serial number of the storage device 110, and/or vendor or manufacturer identifier. One or more of the data items included in the inquiry response 170 can be used to generate a digital destruction certificate, certifying that the storage device 110 has been retired.

In any of the examples described herein, a storage device can be a device capable of storing data in one or more physical storage media. For example, the storage device can be a magnetic storage device, such as a hard disk drive, that is capable of storing data in one or more magnetic recording formats. Other examples of storage devices include flash storage devices (such as NAND-type flash devices and NOR-type flash devices), and random access data storage devices (such as DRAM devices). Further examples of storage devices include non-volatile dual in-line memory modules (NVDIMMs).

In some embodiments, the storage device comprises multiple disparate storage media. For example, the storage device can be a hard disk drive that comprises one or more magnetic disks and an internal memory. In another example, the storage device comprises solid state storage and magnetic storage. In another example the storage device comprises multiple magnetic disks organized as a Redundant Array of Independent Disks (RAID). Other combinations of disparate storage media are also possible.

In any of the examples described herein, a storage device controller can comprise one or more hardware components of a storage device. The storage device controller can comprise a firmware stored in a read-only memory (ROM) of the storage device, a storage medium of the storage device, or some combination thereof. Additionally or alternatively, the storage device controller can be implemented at an intermediate layer between an application and the storage device. Such an intermediate layer controller can comprise software (such as a driver) and one or more processors, a system-on-chip (SoC), a field-programmable gate array (FPGA), and/or an application-specific integrated circuit (ASIC).

In some embodiments, the storage device controller can be part of an application. In such an embodiment, the application may use the storage device controller to access a storage device directly, without using an intermediate layer, such as a driver.

The storage device controller can be located on a computer containing the storage device, or on a separate computer that is connected to the storage device via a communications channel, such as a computer network.

In any of the examples described herein, a data block (or block of data) can be a sequence of data units, such as bytes, bits, etc., that has a fixed size (sometimes referred to as a "block size"). In a storage device that supports data blocks, data is read from and/or written to the storage device one block at a time. A data block can have a physical address that identifies a position where it is stored in the storage device and a logical address, such as a logical block address (LBA), which is used by external components to identify and access the data block. By using logical addresses, the physical storage locations of data blocks in the storage device can change without having to notify or update any external components.

In any of the examples described herein, a host computer can be a server or other computing device that comprises a processor and is connected to a storage device. The host computer is connected to the storage device and configured to transmit commands, such as data access commands (i.e., commands to perform data read and write operations), inquiry commands, destruction commands, or the like, to the storage device. The host computer can be configured to receive command responses from the storage device. The connection can be a direct connection, such as a cable or bus connection, an indirect connection, such as a connection over a network, or some combination thereof. In scenarios where the host computer is connected to more than one storage device, the various connections can be of the same type or different types.

In some embodiments, the host computer can comprise a storage controller connected to multiple storage devices. In at least some embodiments, the host computer can be a computing device configured to provide a unified access point for multiple connected storage devices, such as a JBOD ("just a bunch of drives/disks") device, a RAID array controller, etc.

In any of the examples described herein, a digital destruction certificate can comprise one or more files containing information identifying a storage device that has been remotely destroyed. In at least some embodiments, the digital destruction certificate can be signed with a cryptographically strong signature. For example, the digital destruction certificate can contain an electronic thumbprint generated using a cryptographic key stored in a digital certificate issued by a trusted certificate authority.

FIG. 2 is a flowchart depicting an example method 200 for digitally reclaiming a failed storage device. Any of the example systems described herein can be used to perform the example method 200.

At 202, it is determined that a storage device has failed. The determination can be made by a storage device controller of the storage device, a host computer connected to the storage device, and/or a storage service. Determining that the storage device has failed can comprise detecting that the storage device is not operating within acceptable parameters. For example, a rate of data access operations for the storage device may be below an acceptable level. A rate of acceptable or "healthy" performance over a period of time can be specified. When a rate of performance of the storage device deviates from the "healthy" rate by a specified amount, and/or over a specified time span, the storage device can be marked as failed. For example, a "healthy" range of data access rates can be provided. When a data access rate of the storage device moves outside of this range, the storage device can be marked as failed. In some cases, a storage device may become completely nonresponsive or return an error message instead of an expected response. In such cases, the storage device can be marked as failed. Additionally or alternatively, the storage device can be marked as failed if the storage device is nonresponsive for a specified period of time.

Additionally or alternatively, a minimum acceptable performance metric (such as a minimum rate of data access operations) can be specified. A rate of data access operations for the storage device can be tracked over a given period of time. If the rate of data access operations for the storage devices less than the minimum specified rate, the storage device can be marked as failed.

At 204, the storage device is placed in a retired mode. Placing the storage device in the retired mode can comprise transmitting a command to the storage device to change an operational mode of the storage device from active to retired. The storage device can receive such a command and process the command, for example, by updating an internal operational mode indicator. In at least some embodiments, the internal operational mode indicator can be stored in a firmware of the storage device. The storage device can refer to the internal operational mode indicator before processing a data command that is received. If the internal operational mode indicator indicates that the storage device is retired, the storage device can reject any received data command. Optionally, the retired mode can allow the storage device to respond to inquiry commands. For example, upon receipt of an inquiry command, the storage device can retrieve data from a retirement page in the firmware of the storage device. The data retrieved from the retirement page can include, for example, a vendor identifier, a model identifier, a density of the storage device, a current firmware version number of the storage device, and/or a serial number of the storage device.

Additionally or alternatively, one or more custom fields can be stored in the retirement page. The command to put the storage device in the retired mode can include one or more custom field values that can be stored in the one or more custom fields in the retirement page. This can be done, for example, before the storage device is placed in the retired mode. Such custom fields can include, for example, telemetry and/or performance information for the storage device. Such information can be retrieved via an inquiry command and used as part of a failure analysis.

In a different or further embodiment, after the firmware of the storage device has been updated to indicate that the storage device is in the retired mode, the storage device can modify the firmware to prevent future updates to the firmware of the storage device. For example, the firmware of the storage device can include a field that indicates whether updates to the firmware of the storage device are allowed. A value of such a field can be updated to indicate that no updates are allowed. Additionally or alternatively, one or more code modules stored in the firmware that are responsible for performing a firmware update can be deleted.

In at least some embodiments, the storage device will reject commands to place the storage device in a retired mode while the storage device is running in an active operational mode. In such embodiments, a reset command can be transmitted to the storage device to cause the storage device to restart. After the storage device has restarted, but before it has re-entered an active operational mode, the command can then transmitted to the storage device to put the storage device in the retired mode. For example, a BIOS of a host computer connected to the storage device can be instructed to update an operational mode flag in the firmware of the storage device to indicate that the storage device is retired after the storage device has restarted, but before it is locked to further updates.

At 206, a digital destruction certificate is generated for the storage device. The digital destruction certificate can be generated by a storage device controller of the storage device, a host computer connected to the storage device, and/or a storage service. The digital destruction certificate can comprise identifying information about the storage device, such as a manufacturer identifier of the storage device, a model identifier of the storage device, a serial number of the storage device, and/or a date that the storage device was placed in the retired mode. In at least some embodiments, such identifying information can be retrieved from the storage device by issuing an inquiry command to the storage device. In a different or further embodiment, the digital destruction certificate can only be generated after the storage device has been placed in the retired mode.

In a particular embodiment, a retirement page of the firmware of the storage device contains a digital destruction identifier that is unique to the storage device. The digital destruction identifier can be retrieved from the storage device after the storage device has been placed in the retired mode and can be included in the digital destruction certificate.

In at least some embodiments, the digital destruction certificate can be stored on the storage device and retrieved using an inquiry command.

In at least some cases, the digital destruction certificate can be provided to a manufacturer or vendor of the storage device to obtain a return merchandise authorization for the storage device without physically destroying the storage device.

FIG. 3 is a flow chart of an example method 300 for processing storage device commands in a storage device that supports a retired mode. Any of the example systems described herein can be used to perform the example method 300.

At 302, a command is received at the storage device. The command can comprise, for example, a command to perform a data access operation. Example data access operations include operations to retrieve data stored in one or more storage locations of the storage device and operations to stored data in one or more of the storage locations of the storage device. Additionally or alternatively, the command can comprise an inquiry command to retrieve information about the storage device. Example information that can be retrieved using an inquiry command includes a model identifier for the storage device, a manufacturer identifier for the storage device, a serial number for the storage device, a current operational state of the storage device (e.g., is the storage device in an active operational mode, a retired operational mode, etc.), an available capacity of the storage device, a total capacity of the storage device, etc.

Alternatively or additionally, the command can comprise a command to update the firmware of the storage device and/or a command to retire the storage device. Other types of storage device commands are also possible.

At 304, it is determined whether the storage device is retired. Such a determination can be made, for example, by inspecting an operational mode flag stored in the storage device. The operational mode flag can indicate a current operational mode of the storage device. In at least some embodiments, the operational mode flag can be stored in a firmware of the storage device. Additionally or alternatively, determining whether the storage device is retired can include inspecting the firmware of the storage device for the existence of one or more operational modules that are used to perform data access operations. If the one or more operational modules have been removed from the firmware, in at least some cases it can be determined that the storage device has been retired.

In at least some embodiments, the storage device is placed in a separate operational mode when it is retired (a "retired mode") that only supports inquiry commands. In such embodiments, an express check does not need to be performed to determine whether the storage device is retired since the storage device's functionality will be limited to the features supported by the retired mode. In a different or further embodiment, the operational mode of the storage device is set when the storage device is booted.

If the storage device is not retired, then at 306 the received command is processed. As discussed above, the command can comprise a data access command. The data access command can be processed by reading and/or writing data to/from the storage device. In a scenario where the command comprises an inquiry command, the requested data about the storage device can be retrieved and/or calculated and then returned. In a scenario where the command comprises a firmware update for the storage device, one or more operational modules stored in the firmware of the storage device can be updated. In a scenario where the command comprises a command to retire the storage device, one or more operations can be performed to place the storage device in a retired mode, as described herein.

If the storage device is retired, then at 308 it is determined whether the received command comprises only an inquiry command. Whether the command comprises an inquiry command can be determined by inspecting a command type indicator provided as part of the command. For example, an enumeration of possible command types can be defined in which a different value is associated with each command type. One or more of these enumeration values can be provided as part of the command to indicate one or more command types for the command. Additionally or alternatively, a name or moniker can be defined for each supported command type. One or more such names or monikers can be provided as part of the command. The provided command typed value can be inspected and compared to a command of value associated with the inquiry command type. If the values match, it can be determined that the received command comprises an inquiry command.

If the command comprises an inquiry command, then at 310 the inquiry command is processed. When the storage device is retired, processing the inquiry command can comprise retrieving data from a retirement page of the storage device's firmware. Additionally or alternatively, a date and/or time that the storage device was retired can be returned, along with failure information pertaining to the storage device. Such information can be used, in at least some cases, to determine when the storage device failed and/or why the storage device failed.

If the command does not comprise an inquiry command, then at 312 the command is rejected. Rejecting the command can comprise returning an error message, such as an error code. Additionally or alternatively, rejecting the command can comprise returning a message indicating that the storage device has been retired.

FIG. 4 is a flowchart of an example method 400 for remotely destroying a storage device. The example method 400 can be performed using any of the example systems described herein.

At 402, a failed storage device is detected. Detecting the failed storage device can comprise monitoring the storage device for a failure condition. For example, data access performance of the storage device can be monitored over a period of time and it can be determined that a data access rate of the storage device is below a specified threshold. It can be determined that the storage device is failed, in at least some cases, when the data access rate of the storage device remains below the specified threshold for a given period of time. In a different or further embodiment, responses from the storage device can be monitored to look for error responses from the storage device. An error response can be a response that indicates that the storage device has encountered a failure condition which prevents the storage device from performing a requested operation. Additionally or alternatively, an error response can be a response comprising an incorrect result. For example, a storage device may return the wrong data and/or corrupted data in response to a data read request. In a different or further embodiment, detecting the failed storage device can comprise detecting that the storage device has stopped responding to commands.

At 404, it is determined whether the storage device supports remote destruction. Determining whether the storage device supports remote destruction can comprise searching a feature list of the storage device for a remote destruction feature, such as a retired mode feature. Such a feature list can be stored in a firmware or read-only memory of the storage device. Alternatively, the feature list can be stored in association with an identifier of the storage device (such as a serial number for the storage device) in a separate storage location.

If the storage device does not support remote destruction, then control moves to 416.

If the storage device does support remote destruction, then at 406 data stored in the storage device is sanitized. Sanitizing the data stored on the storage device comprises transmitting commands to the storage device to render data stored on the storage device unreadable. In at least one embodiment, sanitizing the data in the storage device comprises cryptographically scrambling the data. For example, at least a portion of the data stored in the storage device can be hashed using a cryptographic hashing algorithm (such as SHA-256, etc.). In a different example, the data stored in the storage device can be encrypted using a symmetric or asymmetrical encryption algorithm. After the data is encrypted, the symmetric and/or asymmetric encryption key(s) can be destroyed to prevent decryption of the data.

In at least one embodiment, the storage device is configured to store all data in an encrypted format using a key that is stored in the storage device and is not accessible outside of the storage device. In such an embodiment, sanitizing the data in the storage device can comprise issuing a command to the storage device to delete the encryption/decryption key, thereby making the data stored on the storage device on retrievable.

In another embodiment, sanitizing the data stored in the storage device can comprise zeroing the data, wherein the value of each storage location of the storage device is set to 0.

At 408, the storage device is placed in a retired mode. Placing the storage device in the retired mode can comprise transmitting a command to the storage device to change an operational mode of the storage device from active to retired. Placing the storage device in the retired mode can prevent the storage device from processing commands to read data from and write data to the storage device. In at least some embodiments, a current operational mode of the storage device is indicated by a value stored in a firmware of the storage device. Upon receipt of the command the place the storage device in the retired mode, the storage device can update such a value in the firmware to indicate that the storage device is now in the retired mode. This value can be inspected by the storage device upon receipt of any command to read and/or write data prior to processing the command. In at least some embodiments, placing the storage device in the retired mode can cause the storage device to update the firmware of the storage device to disable data management. For example, the storage device can erase one or more operational code modules from the firmware in order to prevent the storage device from performing subsequent read and/or read operations.

At 410, one or more storage media of the storage device are destroyed. Destroying a storage medium of the storage device comprises transmitting one or more commands to the storage device that cause the storage device to perform one or more operations that render the storage medium unusable for storing data. For example, in an embodiment where the storage medium comprises a magnetic disc, destroying the storage medium can comprise transmitting a command to the storage device that will cause the storage device to crash a read and/or write head of the storage device into a surface of the magnetic disk.

In an embodiment where the storage medium is a solid state storage medium, destroying the storage medium can comprise transmitting one or more commands to the storage device that cause the storage device to perform repeated random access write operations to exhaust the ability of the solid state storage medium to store data. For example, data can be written to at least some solid state storage media only a finite number of times before the storage locations in the storage medium can no longer retain data. In at least some cases, repeated random access write operations can increase the write amplification of a solid state storage medium, thereby increasing an overall number of writes performed by the storage device and exhausting the storage medium. In a different or further embodiment, continuous erase operations can be issued to the solid state storage medium to exhaust it. Additionally or alternatively, one or more translation tables can be deleted from the storage device.

At 412, the firmware of the storage device is locked. Locking the firmware of the storage device disables firmware updates for the storage device. Locking the firmware can comprise updating a value in the firmware to indicate that attempts to update the firmware of the storage device should be rejected. Additionally or alternatively, one or more operational code modules that are responsible for updating the firmware of the storage device can be erased from the firmware, thereby causing subsequent attempts to perform firmware updates to fail. In at least some cases, locking the firmware of the storage device can prevent the storage device from being taken out of the retired mode.

At 414, a notification is transmitted indicating that the storage device has been destroyed. The notification can indicate that the storage device failed and was rendered inoperable. In at least some embodiments, the notification comprises information about the storage device that can be used to generate a digital destruction certificate for the storage device. In a different or further embodiment, the notification comprises information about causes of failure of the storage device or an identifier that can be used to look up such information in a separate storage location.

At 416, the storage device is scheduled for physical destruction. For example, an identifier of the storage device can be added to a list of remotely destroyed storage devices. In an embodiment where a host computer is connected to multiple storage devices, a percentage of the storage devices connected to the host computer that have been remotely destroyed can be tracked and updated. When the percentage of remotely destroyed storage devices for the host computer is greater than or equal to a specified threshold, the host computer can be taken off line and the storage devices that have been remotely destroyed can be removed and physically destroyed. Physically destroying the storage devices can comprise sending the storage devices through a grinding or shredding appliance.

Figure 5:
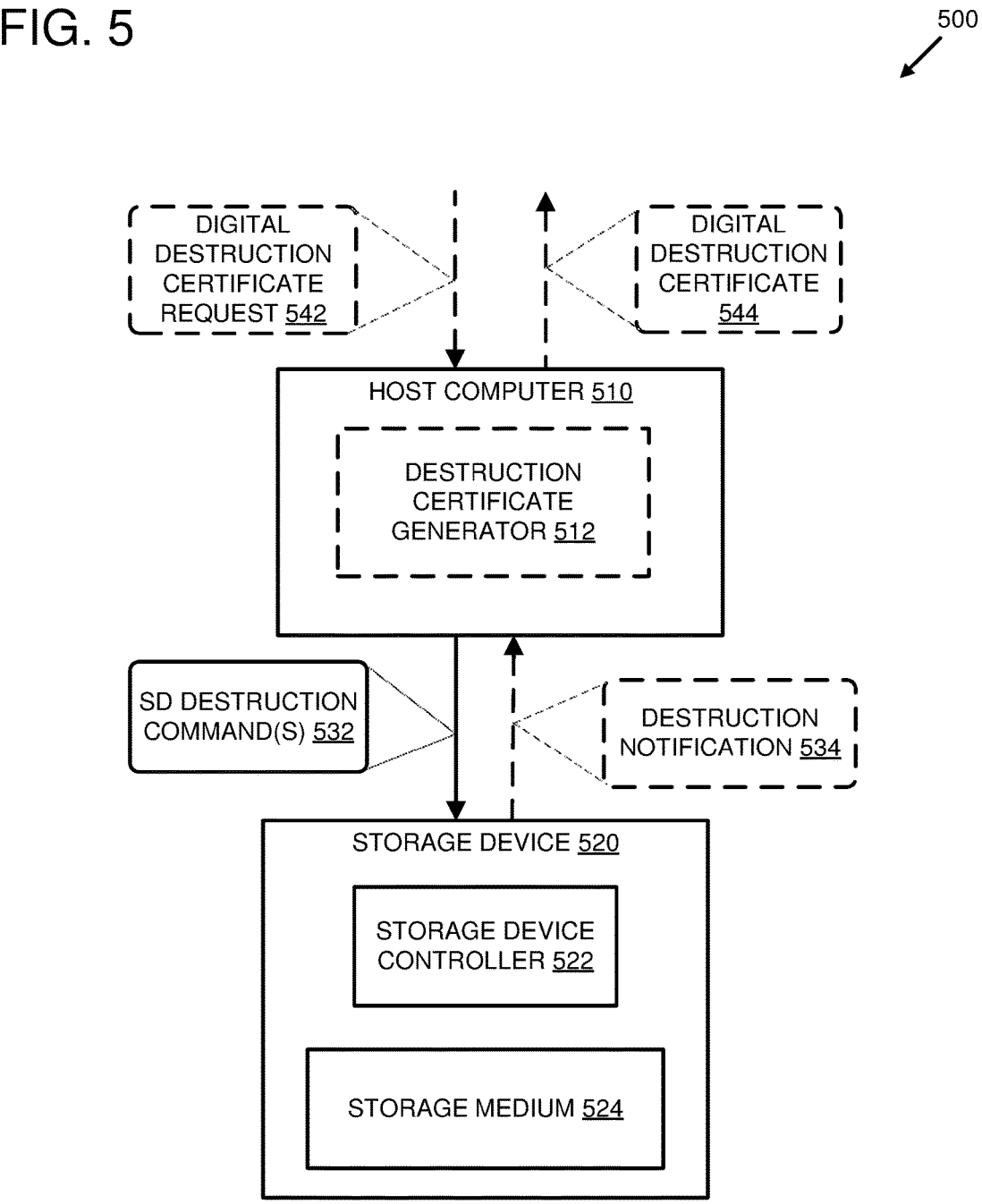
FIG. 5 is a system diagram depicting an example system configured to remotely destroy a storage device.

FIG. 5 is a system diagram depicting an example system 500 configured to remotely destroy a storage device 520. The example system 500 comprises a host computer 510 connected to the storage device 520. The connection between the host computer 510 and the storage device 520 can comprise a physical connection, a logical connection, or some combination thereof.

The storage device 520 comprises the storage device controller 522 and a storage medium 524. The storage device controller 522 is configured to receive commands from the host computer 510 and to transmit responses to the commands to the host computer 510. The commands received by the storage device controller 522 can comprise data access commands. Data access commands can be processed by the storage device controller 522 by retrieving data from and/or writing data to the storage medium 524.

The commands received by the storage device controller 522 comprise one or more storage device destruction commands 532. The host computer 510 is configured to transmit the one or more storage device destruction commands 532 to the storage device 520. The storage device controller 522 is configured to process the one or more storage device destruction commands 532 to render the storage device 520 inoperable for processing data access commands.

The storage device destruction commands 532 can comprise a command to place the storage device in a retired mode as described herein. In a different or further embodiment, the storage device destruction commands comprise one or more commands to sanitize data stored in the storage medium 524. For example, the commands to sanitize the data stored in the storage medium 524 can comprise one or more commands to cryptographically scramble the data or to zero-out all storage locations in the storage medium 524.

In at least one embodiment, the storage device destruction commands 532 comprise one or more commands to physically destroy the storage medium 524. The storage device controller 522 can process such commands by performing one or more operations to render the storage medium 524 incapable of storing data.

Optionally, after the one or more storage device destruction commands 532 have been processed, the storage device controller 522 can transmit a destruction notification 534 to the host computer 510. The destruction notification 534 can indicate that the one or more destruction commands 532 have been processed successfully. In at least one embodiment, when multiple storage device destruction commands 532 are transmitted to the storage device 520, storage device controller 522 can be configured to transmit multiple destruction notifications to the hose computer 510. For example, in a scenario where the host computer 510 transmits commands to sanitize data stored in the storage device 520, to place the storage device 520 in a retired mode, and/or to physically destroy the storage medium 524, the storage device controller 522 can be configured to transmit separate destruction notifications in response to the completion of the separate commands. Additionally or alternatively, if a particular storage device destruction command cannot be processed successfully, the storage device controller 522 can be configured to transmit a notification to the host computer 510 indicating that the digital destruction of the storage device 520 was unsuccessful.

In at least one embodiment, the host computer 510 can be configured to retrieve critical data from the storage device 520 before (or as part of) transmitting the one or more destruction commands 532.

Optionally, the host computer 510 can comprise a destruction certificate generator 512. The destruction certificate generator 512 can be configured to create a destruction certificate for the storage device 520, which indicates that the storage device 520 has been remotely destroyed by the host computer 510. The host computer 510 can receive a digital destruction certificate request 542, requesting certification that the storage device 520 has been remotely destroyed. Optionally, the host computer 510 can transmit one or more commands to the storage device 520 to verify that the storage device 520 has been remotely destroyed. For example, the host computer 510 can transmit an inquiry command to the storage device 520. The storage device controller 522 can be configured to receive the inquiry command from the host computer 510 and to transmit a message in response to the host computer 510, which indicates a current status of the storage device 520. For example, the current status of the storage device 520 can indicate that the storage device 520 is in a retired mode or in an active mode. If the status indicates that the storage device 520 is in a retired mode, then the host computer 510 can generate a digital destruction certificate 544 using the destruction certificate generator 512. The host computer 510 can transmit the digital destruction certificate 544 to the requester.

In at least one embodiment, the response to the inquiry command can contain one or more items of information about the storage device 520 that can be incorporated into the digital destruction certificate 544. Example information items include a manufacturer of the storage device 520, a serial number of the storage device 520, a model number of the storage device 520, a date and/or time of the remote destruction of the storage device 520, etc. Optionally, the response to the inquiry command can contain a destruction verification code that can be included in the digital destruction certificate 544. The destruction verification code can be used by the manufacturer and/or vendor that receives the digital destruction certificate to verify the remote destruction of the storage device 520. The destruction verification code can be uniquely associated with the storage device 520 and, in at least some embodiments, can be retrieved from the storage device 520 only after the storage device has been placed in the retired mode.

Additionally or alternatively, the destruction notification 534 can contain one or more of the items of information about the storage device 520. In such an embodiment, the host computer 510 can store the information contained in the destruction notification 534 in a separate storage location it can use the stored information to generate the digital destruction certificate 544.

Figure 6:
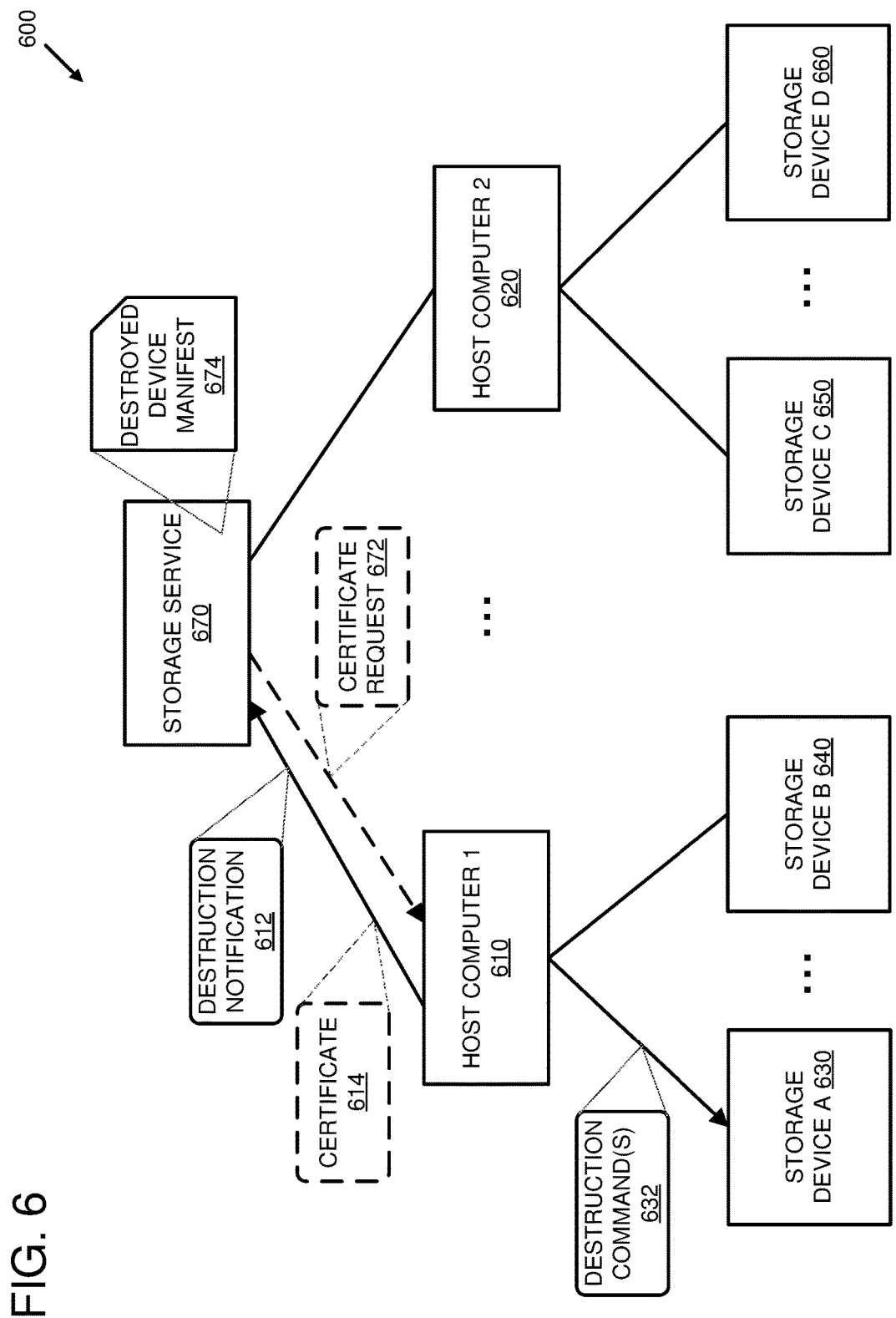
FIG. 6 is a system diagram depicting an example system configured to remotely destroy storage devices connected to multiple host computers.

FIG. 6 is a system diagram depicting an example system 600 configured to remotely destroy storage devices 630-660 connected to multiple host computers 610-620. The example system 600 comprises a storage service 670 connected to the host computers 610-620 via one or more network connections. The storage service 670 can comprise one or more processes executing on one or more server computers. The one or more server computers can be connected to the host computers 610-620 via a computer network.

The host computers 610-620 can each be connected to one or more of the storage devices 630-660. For example, the host computer 610 is depicted as being connected to the storage devices 630-640 and the host computer 620 is depicted as being connected to the storage devices 650-660. The host computers 610-620 can be configured to transmit commands to the connected storage devices 630-660 to remotely destroy one or more of the storage devices 630-660. For example, the host computer 610 is depicted as transmitting one or more destruction commands 632 to the storage device 630 to remotely destroy the storage device 630. The destruction commands 632 can include commands to place the storage device 630 in a retired mode, to sanitize data stored on the storage device 630, to destroy one or more storage media contained in the storage device 630, etc. In at least one embodiment, the destruction commands 632 comprise one or more commands to reset the storage device 630.

For example, in some scenarios the storage device 630 will prevent attempts to place the storage device in a retired mode when it is currently locked in an active mode. In such scenarios, transmitting a hard reset command to the storage device 630 can allow the host computer 610 to change the operational mode of the storage device 630 to a retired mode. Once a storage device has been placed in a retired mode, the storage device can be configured to prevent subsequent changes to its operational mode.

In at least some embodiments, when the storage device is locked in an operational mode, it cannot be unlocked except by an authenticated host computer. For example, an authenticated host computer can be in possession of a secret key that is shared with the storage device and is used by the host computer to encrypt secure commands transmitted to the storage device (such as commands to reset the storage device and/or commands to put the storage device in the retired mode). The storage device can be configured to authenticate commands received by the storage device using the shared secret key. The storage device can be configured to receive a command to set an operational mode of the storage device only at boot time. In a configuration where the authenticated host is directly connected to the storage device, the authenticated host can ensure that it is the first computing device to issue a command to set the operational mode of the storage device when it is booted. In at least some scenarios, such a configuration can prevent malicious users from transmitting commands to the storage device to place it in the retired mode.

In at least one embodiment, the ability to issue a command to place a storage device in a retired mode is restricted to one or more authenticated agent processes running on a host computer connected to the storage device. In such an embodiment, attempts to issue a command to place a storage device in a retired mode that are made by other processes will be rejected.

In some embodiments, the remote destruction of the storage device can be performed at the request of the storage service 670. For example, the storage service 670 can receive performance metrics for the storage devices 630-660 from the host computers 610-620 and can transmit requests to one or more of the host computers 610-620 remotely destroy one or more of the storage devices 630-660 that the storage service 670 has determined to have failed. Additionally or alternatively, the storage service 670 can be configured to transmit storage device failure criteria to the host computers 610-620 that can be used by the host computers 610-620 to detect failed storage devices. In such an embodiment, a host computer can monitor performance metrics for one or more storage devices connected to the host computer and compare the monitored performance metrics to the storage device failure criteria to determine when one or more of the storage devices has failed. If the host computer determines that one or more of the storage devices has failed, the host computer can transmit one or more destruction commands (e.g., 632) to the one or more storage devices to remotely destroy the storage devices.

Once a storage device has been remotely destroyed, a host computer connected to the storage device can transmit a destruction notification to the storage service 670. For example, after the storage device 630 has been remotely destroyed, the host computer 610 is depicted as transmitting a destruction notification 612 to the storage service 670 indicating that the storage device 630 has been remotely destroyed.

The storage service 670 is configured to receive the destruction notification 612. The storage service 670 comprises a destroyed device manifest 674. The destroyed device manifest 674 can include a list of the storage devices 630-660 that have been remotely destroyed. In at least one embodiment, the destroyed device manifest 674 can be used to schedule remotely destroyed storage devices for physical destruction. For example, the destroyed device manifest 674 can include a storage device identifier (such as a serial number or identifier for a docking bay to which the storage device is connected) and a host computer identifier for the host computer to which the storage device is connected. Once a specified number or percentage of storage devices connected to a particular host computer have been remotely destroyed, the remotely destroyed storage devices connected to the host computer can be scheduled for physical destruction. In at least one embodiment, the destruction notification 612 can include an identifier for the storage device 630 and the identifier for the host computer 610. After receiving the destruction notification 612, the storage service 670 can add the identifiers for the storage device 630 and the host computer 610 to the destroyed device manifest 674. Optionally, the storage service 670 can be configured to re-analyze the destroyed device manifest 674 to determine whether a sufficient number of the storage devices 630-640 connected to the host computer 610 are listed on the destroyed device manifest 674. If so, then the remotely destroyed storage devices connected to the host computer 610 can be scheduled for physical destruction.

Optionally, the storage service 670 can be configured to transmit a request (e.g., 672) to a host computer for a digital destruction certificate for a remotely destroyed storage device. The host computer can be configured to receive such a certificate request and to generate a digital destruction certificate (e.g., 614) for a remotely destroyed storage device (e.g., 630). The storage service 670 can be configured to receive a response from the host computer comprising the digital destruction certificate (e.g., 614). In at least one embodiment, the storage service 670 stores the digital destruction certificate in the destroyed device manifest 674 in association with an identifier for the remotely destroyed storage device. In a different or further embodiment, the storage service 670 can be configured to generate the digital destruction certificate for the storage device 630.

Figure 7:
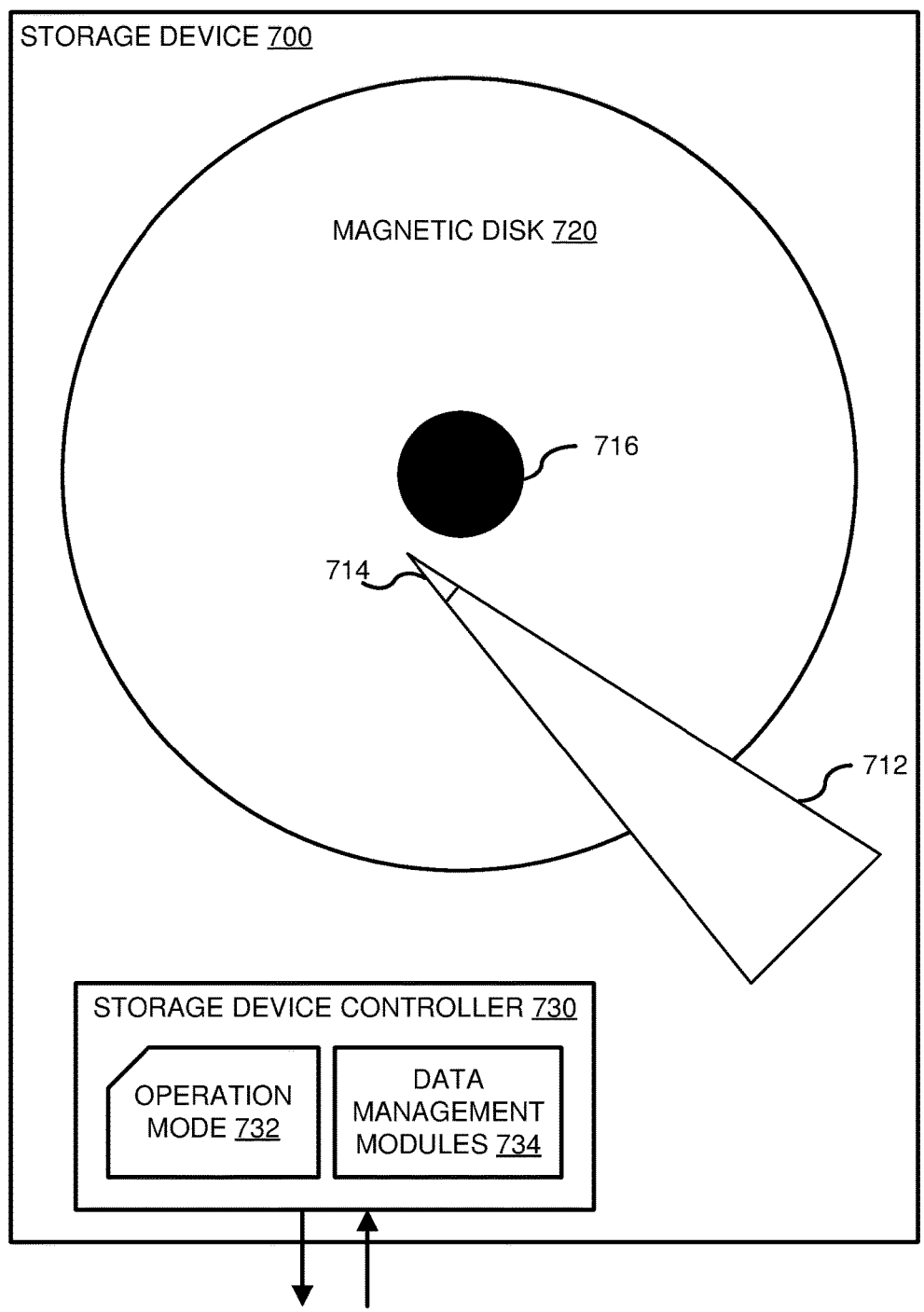
FIG. 7 is a system diagram depicting an example storage device configured to support remote destruction.

FIG. 7 is a system diagram depicting an example storage device 700 configured to support remote destruction. The storage device 700 can be used as a storage device in any of the examples described herein.

The storage device 700 comprises a magnetic disk 720 that can be rotated on a spindle 716. The storage device 700 also comprises a moveable actuator arm 712 with a read/write head 714. The actuator arm 712 can be rotated on an actuator axis (not shown) by an actuator (not shown) to move the read/write head 714 over different portions of the magnetic disk 720. The storage device 700 is configured to write data to and to read data from the magnetic disk 720 using the read/write head 714. The read/write head 714 can comprise a single head that can perform both read and write operations. Alternatively, the read/write head 714 can comprise two separate heads for reading and writing, respectively. The storage device 700 can be configured to use the read/write head 714 to write data to the magnetic disk 720 in multiple concentric circular tracks as the magnetic disk is rotated on the spindle 716.

A storage device controller 730 can process write and read access commands sent to the storage device 700 to write data to and read data from the storage medium 720. The storage device controller 730 can specify a location on the magnetic disk 720 at which the data is to be written or from which the data is to be read. For example, each unit of data stored on the magnetic disk 720 can have a unique address, such as a block address and/or extent within a data block, which identifies the location on the magnetic disk 720 where it is stored.

The storage device controller 730 comprises an operation mode 732 and one or more data management modules 734. The operation mode 732 can represent various states of the storage device 700. For example, the operation mode can represent an active state, in which the storage device controller 730 can process data access operations to retrieve data from and write data to the storage medium 720. The storage device controller 730 can use the data management modules 734 to process requested data access operations. For example, the data management modules 734 can comprise modules for operating the actuator arm 712, operating the spindle 716, and operating the read/write head 714.

The storage device controller 730 is configured to receive and process a command to remotely destroy the storage device 700. Processing the command to remotely destroy the storage device 700 can comprise changing the operation mode 732 from an active mode to a retired mode, in which data access operations will be rejected. Additionally or alternatively, processing the remote destruction command comprises performing operations to destroy the storage medium 720. For example, the storage device controller 730 can cause the read/write head 714 to scrape a surface of the magnetic disk 720 as the magnetic disk 720 is rotated by the spindle 716. This can mar the surface of the magnetic disk 720 and render it incapable of storing data. Additionally or alternatively, scraping the read/write head 714 across the surface of the magnetic disk 720 can physically destroy the read/write head 714.

In a different or further embodiment, processing the command to remotely destroy the storage device 700 comprises deleting one or more of the data management modules 734 to prevent operation of the actuator arm 712, the spindle 716, and/or the read/write head 714. In at least one embodiment, one or more of the data management modules 734 can be used by the storage device controller 732 update the data management modules 734. In such an embodiment, the one or more data management modules used for updating can be deleted to prevent one or more of the data management modules that have been deleted from being re-added.

Figure 8:
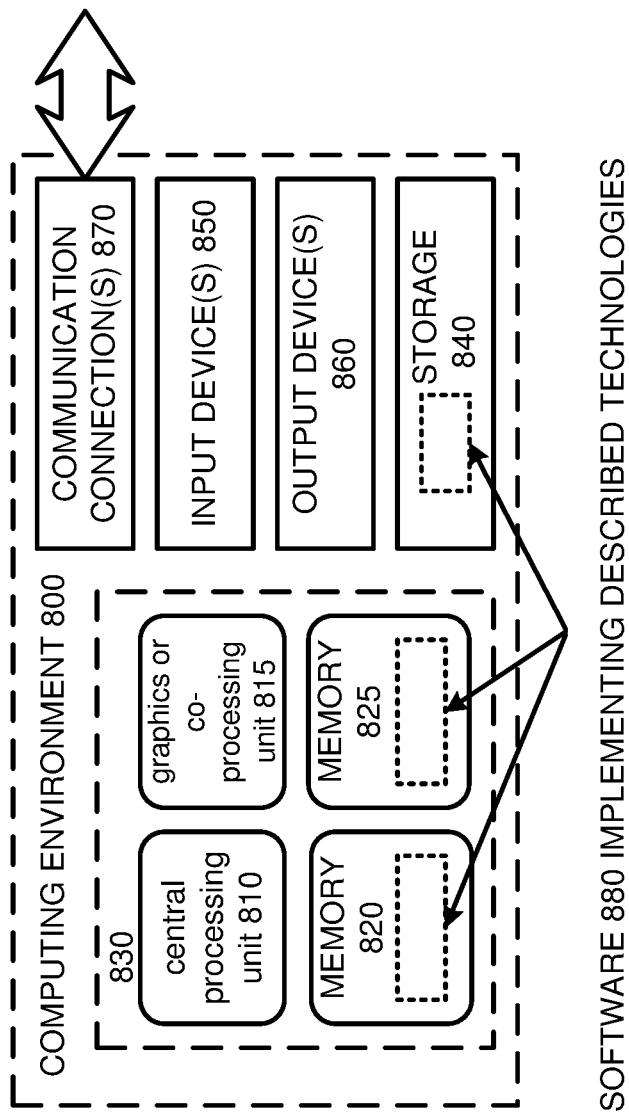
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

In at least some embodiments, the computing environment 800 can be a host computer or server as described herein.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein. In some embodiments, storage 840 comprises one or more of the example storage devices as described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.*The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A system for remotely destroying a storage device, the system comprising:
    a computing device comprising a processor and memory comprising computer-readable instructions that, when executed by the processor, cause the computing device to perform operations, the operations comprising:
        detecting that a storage device connected to the computing device has encountered a failure condition,
        transmitting a command to the storage device to make data stored in the storage device unreadable, and
        transmitting a command to the storage device to enter a mode of reduced operation, in which the storage device will reject data access operations; and
    the storage device, comprising a storage medium, a firmware, and a storage device controller, wherein the storage device controller is configured to:
        receive the command to enter the mode of reduced operation,
        update the firmware to change a mode field in the firmware to indicate that the storage device is in the mode of reduced operation,
        erase a command module from the firmware to prevent the storage device controller from performing data access commands, and
        disable further firmware updates for the storage device.

2. The system of claim 1, wherein:
the computing device is further configured to transmit a command to the storage device to perform operations to render the storage medium unusable for storing data.

3. The system of claim 2, wherein:
the storage medium is a solid state storage medium; and
the operations to render the storage medium unusable for storing data comprise repeated random access write operations that exhaust the ability of the solid state storage medium to store data.

4. The system of claim 1, wherein the command to make the data stored in the storage device unreadable causes the data to be encrypted.

5. The system of claim 1, further comprising:
    a storage service connected to the computing device via a network connection and configured to:
    receive a notification from the computing device indicating that the storage device has been remotely destroyed.

6. The system of claim 5, wherein the storage service is further configured to schedule the storage device for physical destruction.

7. The system of claim 5, wherein the storage service is further configured to:
    transmit a request to the computing device for a digital destruction certificate for the storage device; and
    receive the digital destruction certificate from the computing device.

8. A system, comprising:
    a storage device, comprising a storage medium and a storage device controller, wherein the storage device controller is configured to:
        determine that the storage device has encountered a failure condition;
        put the storage device in a retired mode; and
        generate a digital destruction certificate, wherein the digital destruction certificate indicates that the storage device is inoperable.

9. The system of claim 8, wherein the storage device controller is further configured to, as a result of putting the storage device in the retired mode:

encrypt data stored on the storage device using a cryptographic key; and delete the cryptographic key.

10. The system of claim 8, wherein the storage device controller is further configured to, as a result of putting the storage device in the retired mode:

destroy the storage medium of the storage device.

11. The system of claim 8, wherein the storage device controller is further configured to, subsequent to putting the storage device in the retired mode:

receive a command to access data stored on the storage device; and reject the command to access the data.

12. The system of claim 8, wherein the storage device controller is further configured to:

lock a firmware of the storage device to prevent the storage device from performing firmware updates.

13. The system of claim 8, further comprising:

a host computer connected to the storage device, wherein the host computer comprises:

a processor; and a memory comprising computer-readable instructions that, when executed by the processor, cause the host computer to perform operations, the operations comprising:

determining that the storage device supports remote destruction, wherein the determining comprises inspecting a firmware of the storage device.

14. The system of claim 13, wherein:

the operations performed by the host computer further comprise:

transmitting a reset command to the storage device to restart the storage device, and transmitting a command to the storage device to put the storage device in the retired mode after the storage device restarts, wherein the command to put the storage device in the retired mode is encrypted by the host computer using a secret key shared between the host computer and the computing device; and the storage device controller is further configured to:

receive the command to put the storage device in the retired mode, and verify the command using the secret key before putting the storage device in the retired mode.

15. The method of claim 13, wherein the storage device controller is further configured to:

transmit a notification to the host computer indicating that the storage device has been destroyed.

16. A method, comprising:

detecting a failure condition in a storage device by a host computer connected to the storage device;

transmitting a command from the host computer to the storage device to render data stored on the storage device unreadable;

transmitting a command from the host computer to the storage device to change an operational mode of the storage device to a retired mode;

updating a firmware of the storage device to disable data management; and generating a digital destruction certificate for the storage device.

17. The method of claim 16, further comprising:

transmitting a command from the host computer to the storage device to destroy a storage medium of the storage device.

18. The method of claim 17, wherein:

the storage medium is a solid state storage medium; and the command to destroy the storage medium causes repeated random access write operations that exhaust the ability of the solid state storage medium to store data.

19. The method of claim 16, wherein updating the firmware of the storage device comprises:

deleting an operational code module from the firmware; and disabling firmware updates for the storage device.

20. The method of claim 16, further comprising:

transmitting an inquiry command from the host computer to the storage device; and receiving a response at the host computer from the storage device, the response comprising the digital destruction certificate.

* * * * *